United States Patent
Genise

Patent Number: 5,279,172
Date of Patent: Jan. 18, 1994

[54] FOUR POSITION FLUID-ACTUATED PISTON ARRANGEMENT

[75] Inventor: Thomas A. Genise, Dearborne, Mich.

[73] Assignee: Eaton Corporation, Cleveland, Ohio

[21] Appl. No.: 965,680

[22] Filed: Oct. 22, 1992

[51] Int. Cl.$^5$ .............................. F16H 59/04
[52] U.S. Cl. ...................................... 74/335
[58] Field of Search ................ 74/335, 346, 364

[56] References Cited

U.S. PATENT DOCUMENTS

| | | | |
|---|---|---|---|
| 2,157,592 | 5/1939 | Casler | 74/346 X |
| 2,297,026 | 9/1942 | Sanford et al. | 74/346 |
| 2,432,712 | 12/1947 | Bachman et al. | 74/346 X |
| 2,931,237 | 5/1960 | Backus | 74/335 |
| 2,974,766 | 3/1961 | Perkins et al. | 74/364 X |
| 3,058,364 | 10/1962 | Alfieri | 74/346 X |
| 4,718,307 | 1/1988 | Yabe et al. | 74/335 X |
| 4,899,607 | 2/1990 | Stainton | 74/364 X |
| 4,911,031 | 3/1990 | Yoshimura et al. | 74/335 |

FOREIGN PATENT DOCUMENTS 606421 12/1934 Fed. Rep. of Germany ........ 74/346

*Primary Examiner*—Dirk Wright
*Attorney, Agent, or Firm*—L. J. Kasper

[57] ABSTRACT

A fluid pressure-operated shift actuator (11) is provided of the type defining a series of fluid pressure chambers (69, 71, 91, and 95). The actuator is operable to move a shift finger (19) to any one of four shift rails (1,2,3,4) by actuating various combinations of solenoids (29,31,33). One of the fluid pressure chambers (95) provides a constant bias of the shift finger (19) toward the first shift rail (1). Actuation of the second and third pressure chambers (71,91) results in selection of the third shift rail, because pressurization of the third pressure chamber (91) limits the rightward movement of the crank arrangement (37) which directly controls position of the shift finger (19).

7 Claims, 4 Drawing Sheets

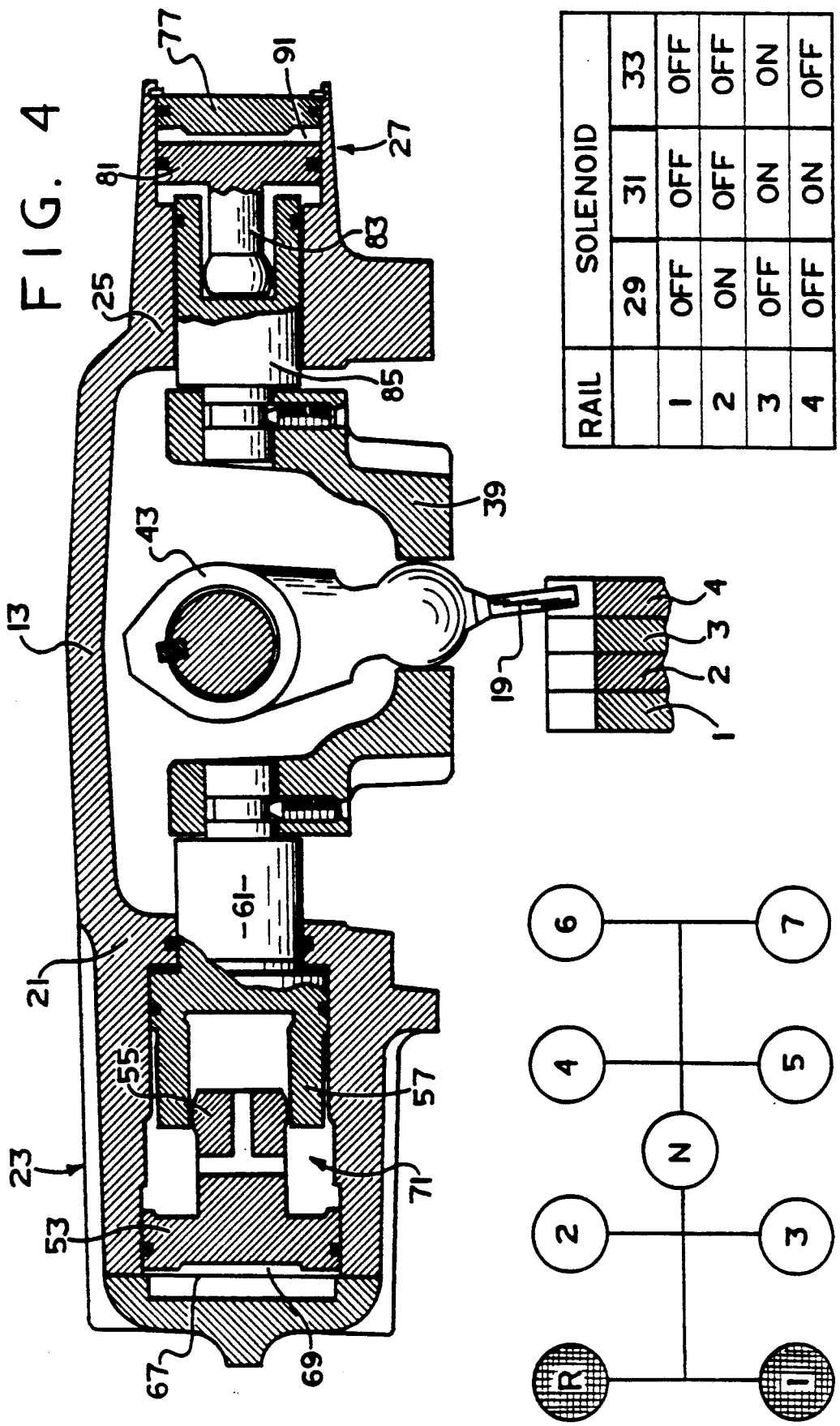

FOUR POSITION FLUID-ACTUATED PISTON ARRANGEMENT

BACKGROUND OF THE INVENTION

The present invention relates to a pressurized fluid operated shifting mechanism for cooperation with a shift bar housing assembly for selectively shifting a change-gear mechanical transmission. More particularly, the present invention relates to such a fluid operated shifting mechanism of the "X—Y" type, and will be described in connection therewith.

Shift bar housing assemblies for change-gear mechanical transmissions typically comprise a plurality of generally parallel, independently axially movable shift bars or shift rails, each carrying a shift fork fixed thereto. Each shift bar or shift rail may be selected and moved axially to effect engagement/disengagement of a particular gear ratio. Such assemblies are well known in the prior art and may be better understood by reference to U.S. Pat. Nos. 4,455,883; 4,575,029; and 4,584,895, all of which are incorporated herein by reference.

Such shift bar housings may be manually controlled by the vehicle operator, by means of a shift lever. More recently, it is becoming increasingly popular to utilize automatically controlled pressurized fluid actuating shift-actuators with such shift bar housings. In a pressurized fluid operated shift-actuator, a shift finger is automatically moved in the X—X (rail selection) direction, in response to actuation of one fluid pressure device, then the shift finger is automatically moved in the Y—Y (gear engagement/disengagement) direction in response to actuation of another fluid operated device.

Shift bar housing assemblies utilizing pressure operated shift-actuators to control each shift rail in an automatic or semi-automatic mechanical transmission are known in the prior art, as may be better understood by reference to U.S. Pat. Nos. 4,445,393, 4,722,237, and 4,928,544 all of which are incorporated herein by reference.

The prior art fluid operated shift-actuators for providing automatic and/or semi-automatic rail selection of change gear mechanical transmissions were generally satisfactory for use with transmissions including only three shift rails (i.e., five forward speeds plus reverse). However, it has become quite desirable to be able to achieve automatic and/or semi-automatic rail selection and shifting of transmissions having four shift rails (i.e., seven forward speeds plus reverse). See for example U.S. Pat. No. 4,388,838, assigned to the assignee of the present invention and incorporated herein by reference. For such transmissions, the known fluid pressure operated shift-actuator for moving the shift finger in the X—X (rail selection) direction, is not commercially available, and is not known in the prior art.

SUMMARY OF THE INVENTION

Accordingly, it is an object of the present invention to provide an improved fluid operated shift-actuator for a mechanical transmission which is capable of selecting from among four different shift rails, while utilizing only a single source of pressurized fluid, and only three pistons and solenoid valves.

It is a more specific object of the present invention to provide such an improved shift-actuator in which two of the piston and solenoid valves are disposed on one axial side of the shift finger, while the third piston and solenoid valve are located on the other axial side of the shift finger, thus making it possible to avoid the use of three progressively larger fluid pressure pistons in sequence, on one axial side of the shift finger.

The above and other objects of the invention are accomplished by the provision of a fluid pressure-operated shift actuator for use with a mechanical transmission having a plurality of axially movable shift rails, the shift actuator being operable to move a shift finger in the X—X direction to engage a desired one of the shift rails. The shift actuator includes housing means including first and second bores disposed on one side of the shift finger, and a third bore disposed on the other side of the shift finger. A first piston is disposed in the first bore, and cooperates therewith to define a first fluid pressure chamber in communication with a source of fluid pressure by means of a first fluid control. A second piston is disposed in the second bore and cooperates therewith to define a second fluid chamber in communication with the source by means of a second fluid control. A third piston is disposed in the third bore, and cooperates therewith to define a third fluid pressure chamber in communication with the source by means of a third fluid control. The plurality of shift rails includes first, second, third, and fourth shift rails. The second and third pistons are operably associated with the shift finger, whereby fluid pressure in the second fluid pressure chamber biases the shift finger toward the fourth shift rail, and fluid pressure in the third fluid pressure chamber biases the shift finger towards the first shift rail. Means are included to provide a constant bias of the shift finger toward engagement with the first shift rail, in the absence of pressure in the first, second, and third fluid pressure chambers. The housing means and the first and second pistons are configured to move the shift finger to engagement with the second shift rail in response to pressure in the first pressure chamber. The housing and the second and third pistons are configured to move the shift finger to engagement with the third shift rail in response to pressure in the second and third pressure chambers, and to move the shift finger to engagement with the fourth shift rail in response to pressure only in the second fluid pressure chamber.

BRIEF DESCRIPTION OF THE DRAWINGS

FIG. 2A is a schematic representation of the shift pattern highlighted to correspond to the actuator position shown in FIG. 2.

FIG. 2B is an enlarged fragmentary, axial cross-section similar to FIG. 2, illustrating a particular detail of the present invention.

FIG. 4 is an axial cross-section, similar to FIGS. 2 and 3, and on the same scale, illustrating the actuator selecting the fourth shift rail.

FIG. 4A is a schematic representation of the shift pattern, highlighted to correspond to the actuator position shown in FIG. 4.

FIG. 5 is a truth table illustrating the operation of the present invention.

DESCRIPTION OF THE PREFERRED EMBODIMENT

Figure 1:
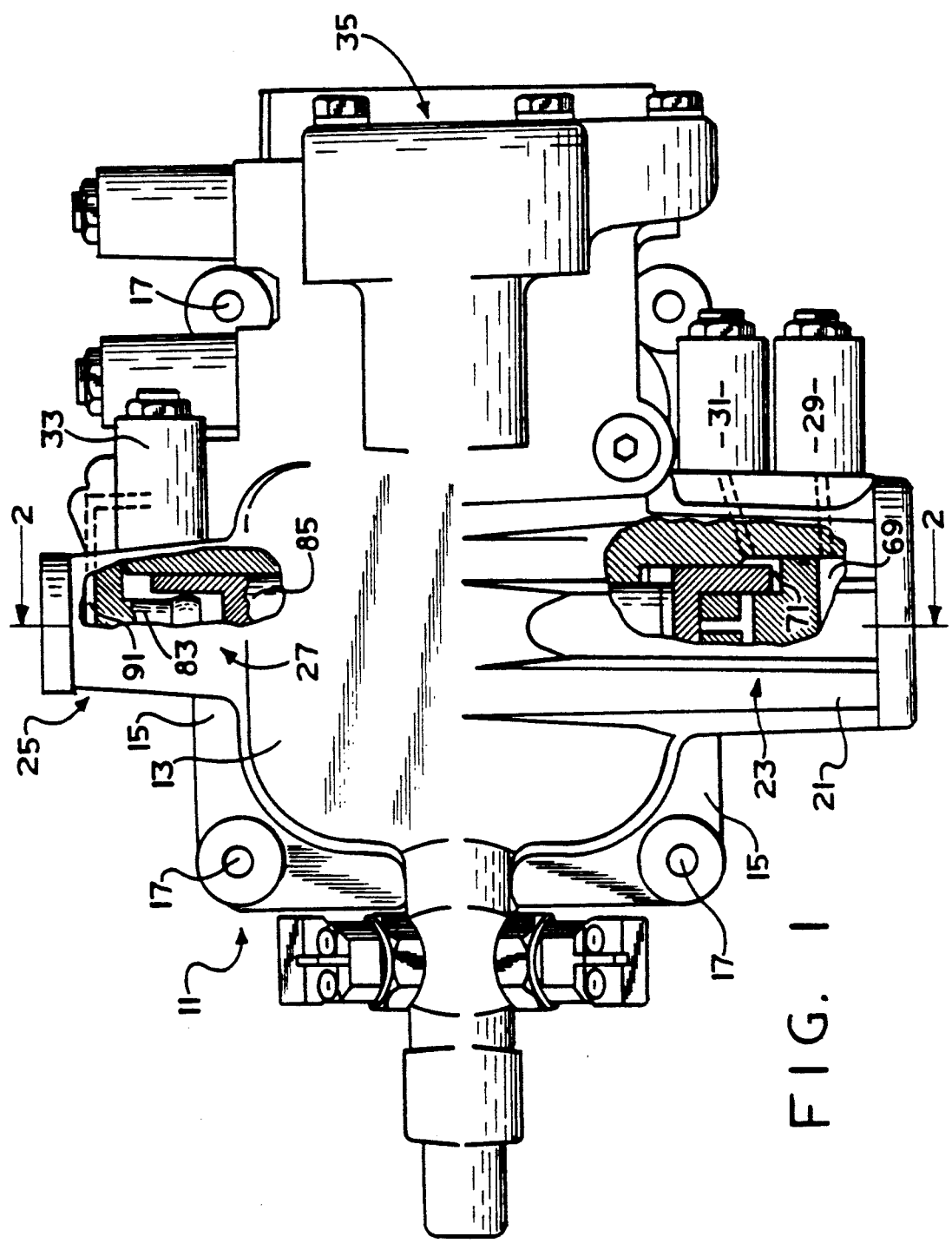
FIG. 1 is a top plan view, partly broken away, of an X—Y shifting mechanism of the type with which the present invention may be utilized.

Referring now to the drawings, which are not intended to limit the invention, FIG. 1 illustrates a top plan view of a fluid operated shift actuator, generally designated 11, of the type with which the present invention may be utilized. The shift actuator would typically be used with a change-gear heavy duty truck mechanical transmission, of the general type now well known in the art, and illustrated in U.S. Pat. No. 3,105,395, incorporated herein by reference.

Such transmissions typically include a shift bar housing assembly of the type shown in above-incorporated U.S. Pat. No. 4,928,544. Such shift-bar housing assemblies (not shown herein) typically comprise a plurality of shift rails movable axially (from left to right, or right to left in FIG. 1, or up and down in the shift pattern of FIG. 2A), each of which carries a shift fork fixed thereto for axial movement therewith, as is well known to those skilled in the art. Shifting of such transmissions is accomplished by selecting a shift rail, by moving an engagement member such as a shift finger along the axis X—X (up and down in FIG. 1, or from left to right, or right to left in FIG. 2A) into alignment with a shift block carried by the selected shift rail. The actual shifting is then accomplished by causing axial movement of the selected shift rail, by axially moving the shift finger to apply an axial force in the direction of the axis Y—Y. Therefore, the fluid operated shift actuator illustrated herein is typically referred to as X—Y type of shift actuator, because it is capable of moving a shift finger in both the X—X direction and the Y—Y direction. It should be clearly understood, however, that the present invention is not specifically limited to use in an X—Y type shift actuator, but instead, may be used in any type of fluid operated shift actuator in which it is required to be able to move the shift finger to any one of four different shift rails.

The X—Y shift actuator 11 is enclosed within a housing 13 having a mounting plate portion 15 defining bolt bores 17 in a pattern allowing the actuator 11 to be mounted to the upper opening of a transmission shift bar housing assembly. As may best be seen in FIG. 2, a shift finger 19 extends downwardly from the housing 13 for interaction with the shift rails (not shown herein). This will be described subsequently.

Figure 2:
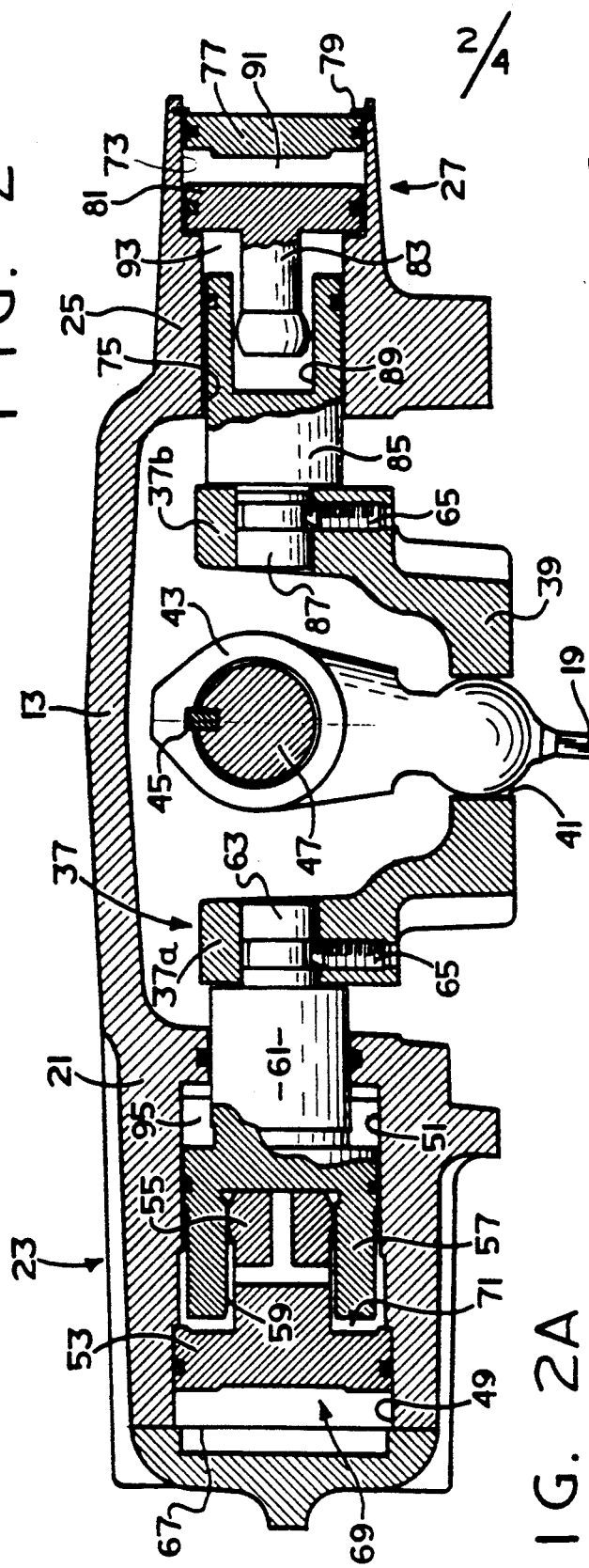
FIG. 2 is a transverse cross-section, taken on line 2—2 of FIG. 1, but on a somewhat larger scale, illustrating an X—X actuator made in accordance with the present invention, shown in a position selecting the second shift rail.

The housing 13 includes a housing portion 21, which encloses a piston-cylinder assembly, generally designated 23, for moving the shift finger 19 transversely in the X—X direction (see FIG. 2). The housing 13 also includes a housing portion 25 which encloses a piston-cylinder assembly, generally designated 27, which is also involved in moving the shift finger 19 in the X—X direction (again see FIG. 2).

Associated with the housing portion 21 and the piston-cylinder assembly 23 is a pair of three-way, two-position solenoid valves 29 and 31. Similarly, associated with the housing portion 25 and the piston-cylinder assembly 27 is another three-way, two-position solenoid valve 33. The solenoid valves 29, 31, and 33 may be of a standard type having a first port connected to a common manifold of pressurized fluid, a second port connected to a common exhaust manifold, and a third port connected to its respective individual pressure chamber, to be controlled by the particular solenoid valve. The valves are normally in the chamber-exhaust position, and by actuation of the solenoids, are movable to the chamber-pressurization position, as will be described in greater detail subsequently.

Referring again only to FIG. 1, the shift actuator 11 includes a Y—Y shift actuator, generally designated 35, which is generally well-known in the art, forms no part of the present invention, and therefore will not be described or even illustrated herein. The Y—Y shift actuator may be made in accordance with the teachings of co-pending application U.S. Ser. No. 919,349, filed Jul. 23, 1992 for a "DUAL FORCE FLUID ACTUATED SHIFT DEVICE", in the name of Thomas A. Genise, the co-pending application being assigned to the assignee of the present invention and incorporated herein by reference.

Referring now primarily to FIG. 2, the X—X shift actuator will be described in detail. The X—X shift actuator comprises primarily the piston cylinder assembly 23, the piston cylinder assembly 27, and a crank arrangement generally designated 37. The crank arrangement 37 includes a generally U-shaped crank member 39, including upstanding portions 37a and 37b, which defines an opening 41 through which the shift finger 19 extends downwardly for engagement with the appropriate one of the shift rails. For purposes of simplicity, the shift rails, from left to right, bear the reference numerals 1, 2, 3, and 4, and in accordance with conventional nomenclature, will hereinafter be referred to as the first, second, third, and fourth shift rails. The shift finger 19 comprises a lower extremity of a shift finger carrier 43, which is in fixed, non-rotatable engagement by means of a key 45, with a piston rod 47. As is well understood by those skilled in the art, the piston rod 47 forms a primary element of the Y—Y shift actuator 35, whereby, after the X—X shift actuator selects the appropriate one of the shift rails 1, 2, 3, or 4, the Y—Y shift actuator 35 moves the piston rod 47 in the appropriate direction (to the left or the right in FIG. 1; into or out of the plane of FIG. 2) to move the selected shift rail in the appropriate direction (e.g., into gear engagement). By way of example only, as may be seen in FIG. 2a, with the shift finger 19 engaging the shift rail 2, actuation of the Y—Y shift actuator 35 can achieve gear engagement to effect operation either in fourth gear or in fifth gear.

Pivotal movement of the shift finger carrier 43 about the axis of the piston rod 47 is accomplished by reciprocating movement of the crank arrangement 37 (i.e., movement from left to right, or from right to left in FIG. 2). Such movement of the crank arrangement 37 is accomplished by appropriate pressurization of the piston-cylinder assemblies 23 and 27. The piston-cylinder assembly 23 will now be described in some detail.

The housing portion 21 defines a stepped cylinder bore including a relatively larger bore portion 49 and a relatively smaller bore portion 51. Disposed within the bore portion 49 is a larger piston 53, including a rightwardly-extending portion 55, the purpose of which will be described subsequently. Disposed within the smaller bore portion 51 is a smaller piston 57, which defines a cylindrical, hollow portion 59, within which the rightwardly-extending portion 55 is received. The smaller piston 57 includes a shaft portion 61, which is received in a bore defined by the housing portion 21, the shaft portion 61 including a smaller diameter terminal portion 63. The terminal portion 63 is received in a bore defined by the U-shaped crank member 39, and is axially restrained relative to the crank member 39 by a set screw 65.

Disposed adjacent the left end of the housing portion 21 (in FIG. 2) is a gasket member 67, and the gasket 67 cooperates with the larger bore portion 49 and the larger piston 53 to define a first fluid pressure chamber 69. The smaller bore portion 51 cooperates with the smaller piston 57 to define a second fluid pressure chamber 71. Fluid pressure in the first and second fluid pressure chambers 69 and 71 is controlled by the solenoid valves 29 and 31, respectively (see FIG. 1). Fluid pressure in either of the chambers 69 or 71 will tend to move crank arrangement 37 to the right in FIG. 2, i.e., toward a higher numbered shift rail.

Referring still primarily to FIG. 2, the piston-cylinder assembly 27 comprises the housing portion 25 defining a stepped bore including a larger bore portion 73 and a relatively smaller bore portion 75. The right end (in FIG. 2) of the larger bore portion 73 is closed by means of a sealed plug 77, held in place by means of a snap ring 79. Disposed within the larger bore portion 73 is a piston 81, which includes a leftwardly-extending portion 83. Disposed within the smaller bore portion 75 is a shaft portion 85, including a smaller diameter terminal portion 87 which is received in a bore defined by the U-shaped crank member 39, in the same manner as previously described, and is restrained axially relative thereto by means of another set screw 65. The shaft portion 85 defines a generally cylindrical, hollow portion 89, which receives the leftwardly-extending portion 83 therein. It should be noted that each of the portions 55 and 83 include a somewhat spherical portion which may be received in a relatively close fit within the respective hollow portion 59 or 89, without affecting the alignment of the pistons 53 and 55, or the piston 81 and shaft portion 85, in the event the respective bore portions are not perfectly concentric.

The plug 77 cooperates with the larger bore portion 73 and the piston 81 to define a third fluid pressure chamber 91, with the fluid pressure in the chamber 91 being controlled by the solenoid valve 33. The smaller bore portion 75 cooperates with the piston 81 and the shaft portion 85 to define a vented chamber 93. By "vented" it is typically meant that the chamber 93 is in permanent communication with a source of low pressure, such as the atmosphere, although those skilled in the art will recognize that the chamber 93 could also be connected to a constant source of relatively low pressure, but which is at a higher pressure than atmosphere. As will be apparent from FIG. 2, fluid pressure in the third fluid pressure chamber 91 will exert a force on the piston 81 tending to move the crank arrangement 37 to the left in FIG. 2, toward a lower numbered shift rail, or at least resisting the tendency of the crank arrangement 37 to move to the right in FIG. 2.

The housing portion 21 cooperates with the shaft portion 61 and the smaller piston 57 to define a fourth fluid pressure chamber 95 which is in continuous fluid communication with a source of fluid pressure, which is, preferably, and for simplicity, the same source to which the solenoid valves 29, 31, and 33 are connected. Fluid pressure in the fourth fluid pressure chamber 95 exerts a biasing force on the smaller piston 57, biasing it and the crank arrangement 37 to the left in FIG. 2, toward engagement with a lower numbered shift rail.

Operation

Referring now primarily to FIGS. 2, 2A, and 5, the operation of the X—X shift actuator of the present invention will be described. With all of the solenoid valves 29, 31, and 33 unactuated, there is relatively low (basically atmospheric) pressure in the first, second, and third fluid pressure chambers 69, 71, and 91. Thus, in this condition, only the fourth fluid pressure chamber 95 contains pressure, which biases both the smaller piston 57 and the larger piston 53 to the left in FIG. 2 until the piston 53 engages the gasket 67. In the condition described, the crank arrangement 37 is moved to the left from the position shown in FIG. 2 a sufficient distance for the shift finger 19 to engage the shift rail 1, such that the operator may then select either sixth gear or seventh gear.

Referring still to FIGS. 2, 2A, and 5, if the solenoid valve 29 is actuated, with the solenoid valves 31 and 33 being unactuated, there is pressure in the first fluid pressure chamber 69 and in the fourth fluid pressure chamber 95, but substantially no pressure in the second and third fluid pressure chambers 71 and 91. In the condition described, the piston 53 is biased to the right in FIG. 2 until it engages a shoulder 97 defined at the intersection of the bore portions 49 and 51 (see FIG. 2B). With the piston 53 biased to the position shown in FIG. 2, the rightwardly-extending portion 55 engages the smaller piston 57, moving it to the right in FIG. 2, overcoming the bias force of the pressure in the fourth fluid pressure chamber 95. The crank arrangement 37 is thus moved to the position shown in FIG. 2, moving the shift finger 19 into engagement with the shift rail 2, such that the operator can then select either fourth or fifth gear.

Although not an essential feature of the invention, in the X—X shift actuator of the present invention, the first fluid pressure chamber 69 has an effective area (i.e., transverse cross-sectional area, subjected to fluid pressure) which is designated A1. The effective area A1 is merely the area of the left end surface of the larger piston 53. The second fluid pressure chamber 71 has an effective area designated A2, the effective area A2 being the net area on the left end surface of the smaller piston 57. Preferably, the effective area A2 is less than the effective area A1. The third fluid pressure chamber 91 has an effective area designated A3, the effective area A3 being merely the area of the right end surface of the piston 81. The effective area A3 is preferably less than A2, although it can be larger than, or the same as, A2. The fourth fluid pressure chamber 95 has an effective area designated A4, the effective area A4 being the area of the right end surface of the piston 57, minus the area of the shaft portion 61. Preferably, the effective area A4 is less than the effective area A3.

Figure 3:
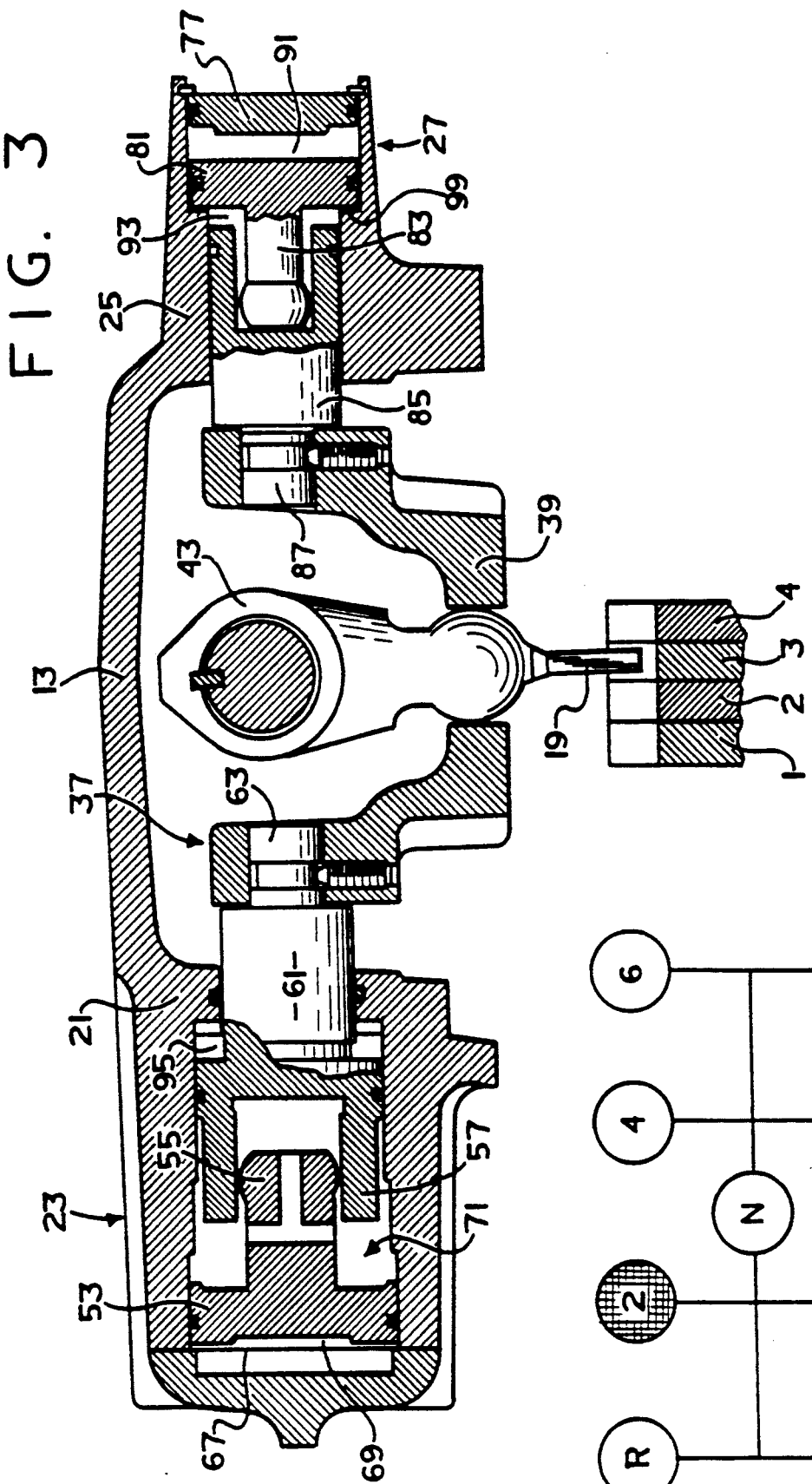
FIG. 3 is a transverse cross-section, similar to FIG. 2, and on the same scale, but with the actuator selecting the third rail.
Figure 3A:
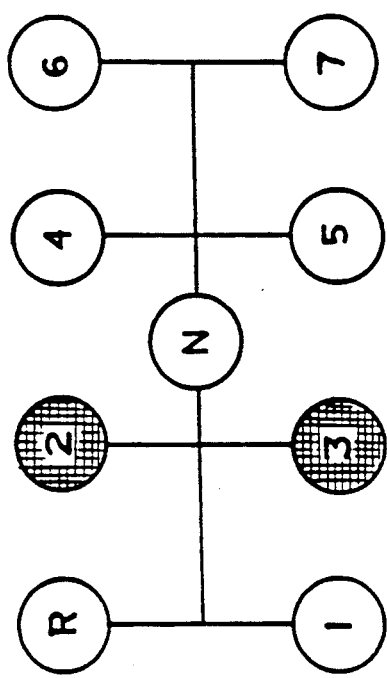
FIG. 3A is a schematic representation of the shift pattern, highlighted to correspond with the actuator position shown in FIG. 3.

Referring now primarily to FIGS. 3, 3A, and 5, if the solenoid valve 29 is de-actuated, and each of the solenoid valves 31 and 33 is actuated, the larger piston 53 will be biased to the left in FIG. 3 by pressure in the second fluid pressure chamber 71, with the piston 53 engaging the gasket 67. In this position, the first fluid pressure chamber 69 decreases to almost zero volume. At the same time, the pressure in the second fluid pressure chamber 71 biases the smaller piston 57 to the right in FIG. 3, in opposition to the constant pressure in the fourth fluid pressure chamber 95. There is also fluid pressure in the third fluid pressure chamber 91, biasing the piston 81 against a shoulder 99 defined at the intersection of the larger and smaller bore portions 73 and 75. In accordance with one aspect of the present invention, the areas of the various pistons and chambers are selected such that the area A2 of the piston 57 is less than the sum of the effective area A3 of the piston 81 plus the effective area A4 of the chamber 95 (also acting on the piston 57). As a result, with both of the solenoid valves 31 and 33 actuated, as shown in FIG. 5, the pressure in the second fluid pressure chamber 71 moves the crank arrangement 37 to the right in FIG. 3 until the shaft portion 85 engages the end of the leftwardly-extending portion 83 (the position shown in FIG. 3). Because of the fluid pressure in the third fluid pressure chamber 91, and further because of the previously described relationship of the effective areas A1, A2, A3, and A4, the biasing force on the piston 57 is not sufficient to overcome the combined biasing forces in the chambers 91 and 95, and the crank 37 stops at the position shown in FIG. 3, with the shift finger 19 in engagement with the shift rail 3, from where the operator can select either second gear or third gear.

Referring now primarily to FIGS. 4, 4A, and 5, there will be described a condition in which the solenoid valves 29 and 33 are de-actuated, and only the solenoid valve 31 is actuated. In that condition, the piston 53 is again biased to the left in FIG. 4 by pressure in the second fluid pressure chamber 71, with the pressure in the chamber 71 again biasing the smaller piston to the right, in opposition to the biasing force of pressure in the fourth fluid pressure chamber 95. The difference in this condition, compared to the condition described in connection with FIG. 3, is that with the solenoid valve 33 de-actuated, there is no substantial fluid pressure in the third fluid pressure chamber 91. Therefore, as the piston 57 moves to the position shown in FIG. 3, there is no longer pressure in the chamber 91 to resist further rightward movement, and the crank 37 and shaft portion 85 continue to move to the right, pushing the piston 81 to the right, reducing the volume of the chamber 91, but at the same time, increasing the volume of the vented chamber 93. As this occurs, the shift finger 19 is moved further to the right, into engagement with the shift rail 4, from where the operator can select either reverse speed gear or first gear.

Thus, it may be seen that with the X—X shift actuator of the present invention it is possible to select any one of four shift rails, utilizing only three pistons and three solenoid valves. Furthermore, it is possible to achieve the desired result without the additional complexity which would result if all three of the pistons were aligned, in sequence, on the same side of the shift finger. Such an arrangement would require a larger and more complex piston-cylinder arrangement.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A fluid pressure operated shift-actuator for use with a mechanical transmission having a plurality of axially movable shift rails, said shift-actuator being operable to move a shift finger in the X—X direction and being adapted to engage a desired one of said shift rails; said shift-actuator including housing means defining first and second bores disposed on one side of said shift finger, and a third bore disposed on the other side of said shift finger; a first piston disposed in said first bore and cooperating therewith to define a first fluid pressure chamber in communication with a source of fluid pressure by means of a first fluid control, a second piston disposed in said second bore and cooperating therewith to define a second fluid pressure chamber in communication with said source by means of a second fluid control, and a third piston disposed in said third bore and cooperating therewith to define a third fluid pressure chamber in communication with said source by means of a third fluid control; said plurality of shift rails including first, second, third, and fourth shift rails, and said second and third pistons being operably associated with said shift finger whereby fluid pressure in said second fluid pressure chamber biases said shift finger toward a position adapted to engage said fourth shift rail and fluid pressure in said third fluid pressure chamber biases said shift finger toward a position adapted to engage said first shift rail; means providing a constant bias of said shift finger toward a position adapted for engagement with said first shift rail in the absence of pressure in said first, second, and third fluid pressure chambers; said housing means and said first and second pistons being configured to move said shift finger to a position adapted for engagement with said second shift rail in response to pressure in said first fluid pressure chamber; said housing means and said second and third pistons being configured to move said shift finger to a position adapted for engagement with said third shift rail in response to pressure in said second and third fluid pressure chambers, and to move said shift finger to a position adapted for engagement with said fourth shift rail in response to pressure only in said second fluid pressure chamber.

2. A fluid pressure operated shift-actuator as claimed in claim 1, characterized by said means providing said constant bias comprises said housing means and one of said second and third pistons defining a fourth fluid pressure chamber in continuous fluid communication with said source of fluid pressure; pressure in said fourth fluid pressure chamber exerting a constant biasing force on said shift finger which is less than the biasing force exerted by pressure in said second fluid pressure chamber.

3. A fluid pressure operated shift-actuator as claimed in claim 2, characterized by said first fluid pressure chamber having an effective area greater than an effective area of said fourth fluid pressure chamber; pressure in said first fluid pressure chamber inserting a biasing force on said shift finger which is greater than the constant biasing force exerted by pressure in said fourth fluid pressure chamber.

4. A fluid pressure operated shift-actuator as claimed in claim 3, characterized by said second fluid pressure chamber having an effective area greater than an effective area of said third fluid pressure chamber; but said effective area being less than the sum of the effective area of said third fluid pressure chamber plus an effective area of said fourth fluid pressure chamber.

5. A fluid pressure operated shift-actuator as claimed in claim 1, characterized by said second and third pistons being operably associated with said shift finger by means of a generally U-shaped crank member having first and second upstanding portions disposed on said one side and said other side, respectively, of said shift finger and defining an opening receiving said shift finger; said second piston being in engagement with said first upstanding portion and said third piston being in engagement with said second upstanding portion.

6. A fluid pressure operated shift-actuator for use with a mechanical transmission having a plurality of axially movable shift rails, said shift-actuator being operable to move a shift finger in the X—X direction to be adapted to engage a desired one of said shift rails; said shift-actuator including housing means defining first and second bores disposed on one side of said shift finger, and a third bore disposed on the other side of said shift finger; a first piston disposed in said first bore and cooperating therewith to define a first fluid pressure chamber in communication with a source of fluid pressure by means of a first fluid control, a second piston disposed in said second bore and cooperating therewith to define a second fluid pressure chamber in communication with said source by means of a second fluid control, and a third piston disposed in said third bore and cooperating therewith to define a third fluid pressure chamber in communication with said source by means of a third fluid control; said plurality of shift rails including first, second, third, and fourth shift rails, and said second and third pistons being operably associated with said shift finger whereby fluid pressure in said second fluid pressure chamber biases said shift finger toward a position adapted to engage said fourth shift rail and fluid pressure in said third fluid pressure chamber biases said shift finger toward a position adapted to engage said first shift rail; one of said second and third pistons defining a fourth fluid pressure chamber in continuous fluid communication with said source of fluid pressure to provide a constant bias of said shift finger toward a position adapted for engagement with said first shift rail in the absence of fluid pressure in said first, second, and third fluid pressure chambers; said first, second, third, and fourth fluid pressure chambers having effective areas, respectively; said effective area being greater than said effective area, and greater than said effective area, but, less than the sum of said effective area plus said effective area.

7. A fluid pressure operated shift-actuator as claimed in claim 6, characterized by said effective area of said first fluid pressure chamber being greater than said effective area of said second fluid pressure chamber, and greater than said effective area of said fourth fluid pressure chamber.

* * * * *